UNITED STATES PATENT OFFICE.

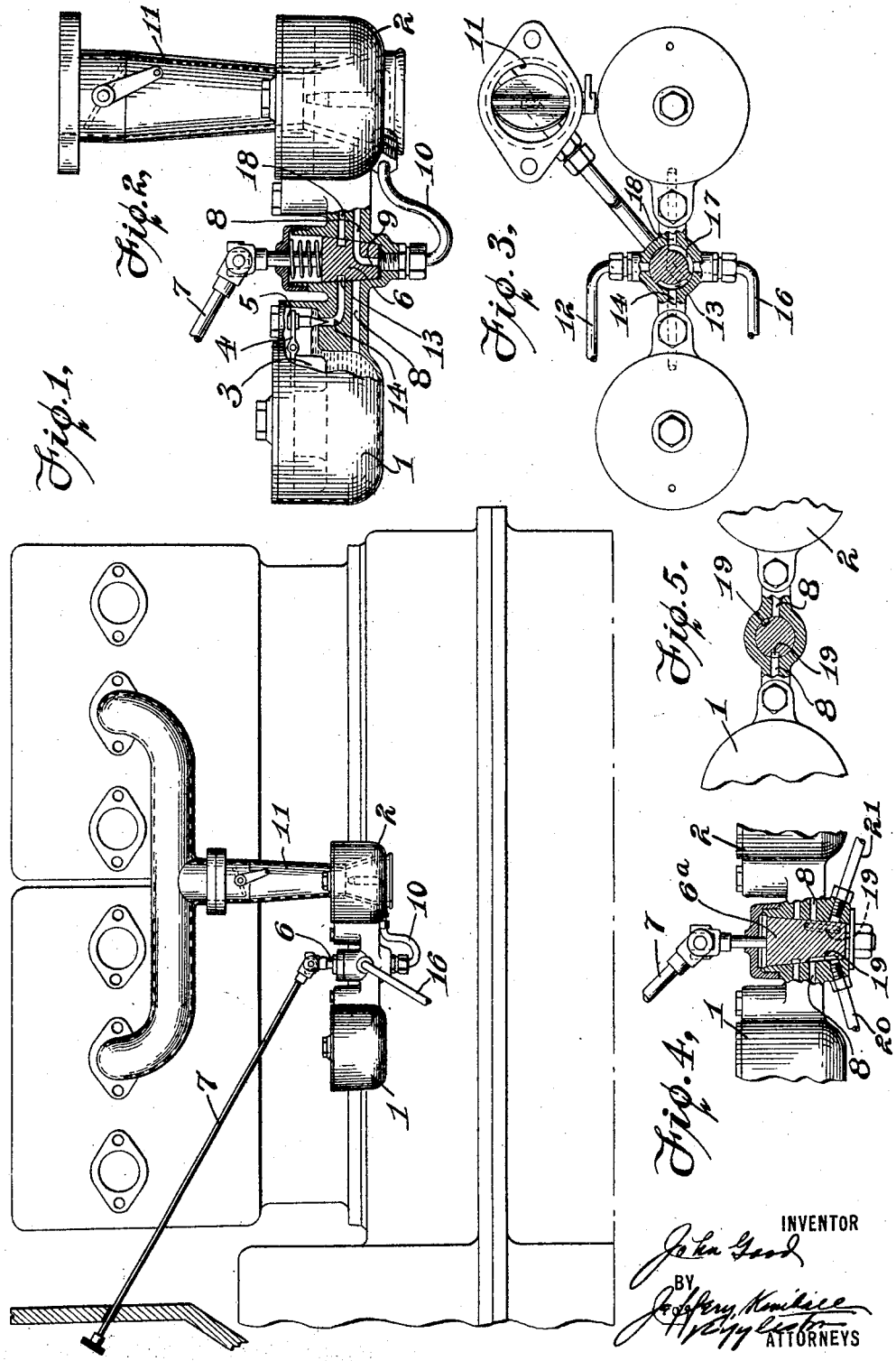

JOHN GOOD, OF GARDEN CITY, LONG ISLAND, NEW YORK, ASSIGNOR TO GOOD INVENTIONS CO., OF NEW YORK, N. Y., A CORPORATION OF NEW YORK.

AUTOMOBILE-ENGINE FUEL-SUPPLY.

1,397,492.  Specification of Letters Patent.  Patented Nov. 15, 1921.

Application filed July 14, 1920. Serial No. 396,242.

*To all whom it may concern:*

Be it known that I, JOHN GOOD, United States citizen, residing in Garden City, Long Island, New York, have invented the following described Improvements in Automobile-Engine Fuel-Supply.

The invention relates to that class of internal combustion engines used for propelling vehicles in which double float chambers are required, one for supplying liquid fuel for preliminary heating the engine and the other for supplying the engine with fuel. Various forms of such apparatus are known and are subject to the defect that their use involves a considerable waste of fuel from that particular float chamber which is not in use. According to the present invention such waste is prevented by incorporating a feed line shut-off passage or port in the valve member used for controlling the exit connection to the engine. The preferred form of the invention is shown in the accompanying drawings, wherein—

Figure 1 illustrates in side elevation and outline an automobile engine;

Fig. 2 an enlarged view of the double float chamber carbureter thereof with parts in section;

Fig. 3 a plan of the same with parts in section; and

Figs. 4 and 5 a modified form.

The two float chambers marked 1 and 2 respectively may be assumed to be of the usual type comprising a float 3 supported by the liquid fuel and connected by a lever 4 to a valve 5 which controls the admission of the liquid fuel from the supply source. The arm of lever 5 that is connected to the float is required to be fairly short in order to preserve a sufficiently constant level of liquid in the chamber when in use and for the same reason the float does not urge the valve 4 against its seat with sufficient pressure to stop the inflow of fuel when subject to the vibration of travel, on which account the liquid overflows through the air vent or through the cover joint and is wasted.

The two float chambers 1 and 2 may be cast in one piece if desired and as indicated in the drawings and the junction between them is formed as a valve chamber containing a valve plug 6, tapered in form and pressed to its seat in the said chamber by a spring or otherwise. This valve is connected through a gimbal joint to a control rod 7 leading to the dash of the automobile and serves as the means whereby the operator may put one or the other of the float chambers into use as presently explained. The delivery ducts 8 from the bottoms of each float chamber enter the lower part of the valve chamber and the valve plug is provided with a port 9 which may be turned into registry with either duct 8 and connected with the outlet by the tube 10 to the carbureting space or chamber 11. Liquid fuel is supplied to float chamber 1 through pipe 12 which leads from the main source of supply to the upper part of the valve chamber, the liquid passing through an arcuate port 13 in the valve plug which connects the same to the horizontal duct 14 leading to the inlet valve of that chamber. Similarly fuel is supplied to the float chamber 2 through a pipe 16, port 17 and duct 18. The two arcuate ports 13 and 17 are so disposed that when the valve plug is set to supply fuel to one float chamber the delivery duct from that float chamber is at the same time connected to outlet tube 10 and the inlet as well as the outlet of the other float chamber is closed. The closure of the inlet or feed line supply to that float chamber prevents waste of fuel therein as above explained and also avoids the excess of fuel delivery incident to a supernormal liquid level in that chamber when it is again connected to the carbureter.

The form of Figs. 4 and 5 involves the same principles as above explained. The valve plug $6^a$ of this form, however, instead of being provided with an L-shaped outlet port such as shown at 9 in Fig. 2 is supplied with a separate outlet port 19 for registry with the outlet ducts 8 from each float chamber and these ports connect respectively with separate delivery pipes 20 and 21 so that the liquid fuel from one float chamber may be used for one purpose or in one particular form of apparatus and that from the other chamber in some other form, thereby accommodating the invention to those types of engines which have separate spray nozzles for different kinds of fuel or which employ a liquid fuel burner for pre-heating the engine. It is of course apparent that the float chambers do not require to be disposed at the same level or in close proximity to each other and that the invention may be variously adapted to the purposes for which it is useful without departing from the principle thereof which has now been fully explained.

Claim.

In an internal combustion engine the combination with two liquid fuel float chambers each having a fuel inlet duct, an outlet duct to the engine and a float and a valve controlled by the float to control the inlet duct, of a single valve member for positively closing both the inlet duct and the outlet duct of each chamber substantially simultaneously and the ducts of the two chambers alternately.

In testimony whereof, I have signed this specification.

JOHN GOOD.